US011065543B2

(12) United States Patent
Morishita

(10) Patent No.: US 11,065,543 B2
(45) Date of Patent: Jul. 20, 2021

(54) PROCESSING DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc.

( * ) Notice: Subject to any disclaimer, the term of this patent is extended or adjusted under 35 U.S.C. 154(b) by 12 days.

(21) Appl. No.: 16/717,558

(22) Filed: Dec. 17, 2019

(65) Prior Publication Data

US 2020/0391110 A1   Dec. 17, 2020

Related U.S. Application Data

(63) Continuation of application No. PCT/JP2019/023062, filed on Jun. 11, 2019.

(51) Int. Cl.
*A63F 13/537* (2014.01)
*A63F 13/573* (2014.01)
*A63F 13/58* (2014.01)
*A63F 13/56* (2014.01)

(52) U.S. Cl.
CPC .......... *A63F 13/537* (2014.09); *A63F 13/56* (2014.09); *A63F 13/573* (2014.09); *A63F 13/58* (2014.09)

(58) Field of Classification Search
None
See application file for complete search history.

(56) References Cited

U.S. PATENT DOCUMENTS

| | | | |
|---|---|---|---|
| 2005/0176502 A1* | 8/2005 | Nishimura ............ | A63F 13/537 463/31 |
| 2006/0205502 A1* | 9/2006 | Kaneshige ............ | A63F 13/04 463/33 |
| 2012/0094770 A1* | 4/2012 | Hall ...................... | A63F 13/332 463/42 |
| 2016/0349866 A1 | 12/2016 | Shikata et al. | |

FOREIGN PATENT DOCUMENTS

| | | |
|---|---|---|
| JP | 2016-221023 A | 12/2016 |
| JP | 2017-123074 A | 7/2017 |
| JP | 6450875 B1 | 1/2019 |
| JP | 2019-025307 A | 2/2019 |
| JP | 2019-047927 A | 3/2019 |

* cited by examiner

*Primary Examiner* — Kevin Y Kim
(74) *Attorney, Agent, or Firm* — Harness, Dickey & Pierce, P.L.C.

(57) ABSTRACT

A processing device includes an input interface that accepts an operation input relating to an effect object from a player in a real world, the effect object being disposed in a virtual space displayed on a display, a memory that stores a parameter associated with one or a plurality of virtual objects, and a processor that executes an instruction command stored in the memory to vary a form of the effect object according to the operation input accepted by the input interface and to vary the parameter associated with at least the one or the plurality of virtual objects according to the form variation of the effect object.

21 Claims, 12 Drawing Sheets

| CHARACTER OBJECT ID | HIT POINT | OFFENSIVE POWER | DEFENSIVE POWER | RECOVERY POWER | SPEED | ACCESSORY OBJECT ID |
|---|---|---|---|---|---|---|
| C1 | 300 | 20 | 100 | 60 | NORMAL | SWORD 1 |
| C2 | 250 | 5 | 20 | 30 | SLOW | -- |
| C3 | 520 | 10 | 20 | 10 | FAST | SWORD 4 |
| C4 | 250 | 30 | 5 | 20 | VERY FAST | SWORD 1 |
| C5 | 400 | 60 | 20 | 20 | NORMAL | SWORD 2 |
| ... | ... | ... | ... | ... | ... | ... |

FIG. 4B

| EFFECT OBJECT ID | ACCESSORY OBJECT ID | SIZE | OFFENSIVE POWER | WEIGHT |
|---|---|---|---|---|
| E1 | SWORD 1 | B1 | 1.2 TIMES | 1kg |
| E2 | SWORD 2 | B2 | 1.0 TIMES | 2kg |
| E3 | SWORD 3 | B3 | 2.0 TIMES | 5kg |
| E4 | SWORD 4 | B4 | 0.8 TIMES | 1kg |
| ... | ... | ... | ... | ... |

FIG. 4C

| OPERATION INPUT | SIZE OF EFFECT OBJECT | RATIO OF VISIBLE AREA | EFFECT |
|---|---|---|---|
| PRESS | SMALL | 90% | 1 TIMES |
| LONG PRESS (t1 TO t2) | MIDDLE | 70% | 2 TIMES |
| LONG PRESS (t2 TO t3) | LARGE | 50% | 3 TIMES |
| LONG PRESS (t3 OR MORE) | EXTRA LARGE | 30% | 5 TIMES |
| ... | ... | ... | ... |

PROCESSING DEVICE, PROGRAM, AND METHOD

CROSS-REFERENCE TO RELATED APPLICATIONS

The present application is a continuation application of International Application No. PCT/JP2019/023062, filed on Jun. 11, 2019, which is expressly incorporated herein by reference in its entirety.

BACKGROUND

1. Technical Field

The present disclosure relates to a processing device, a program, and a method for executing a game application using a virtual object disposed in a virtual space.

2. Related Art

Conventionally, a game application has been known that associates, in a virtual space, various parameters to various virtual objects such as player character objects, enemy character objects, treasure boxes, recovery items, and accessories, etc., and structure objects such as buildings, roads, bridges, mountains, and rivers, etc. For example, JP 2019-025307 A discloses a game application that has a parameter (time extension gauge) related to a main character in a battle game in which a large number of people participate in a battle with an enemy character, and varies the parameter by attacking a sub character.

SUMMARY

Therefore, based on the above-described technology, in the present disclosure, according to various embodiments, a processing device, program, and method are provided to execute a new game application that incorporates a new factor in the variation of parameters associated with a virtual object.

According to one aspect of the present disclosure, provided is "a processing device including an input interface that accepts, from a player, an operation input to an effect object disposed in a virtual space displayed on a display, a memory that stores one or a plurality of virtual objects disposed in the virtual space and parameters associated with one or each of a plurality of the virtual objects, in addition to a predetermined instruction command, and a processor that executes an instruction command stored in the memory to vary a form of the effect object according to the operation input accepted by the input interface and to vary the parameter associated with at least one of one or a plurality of the virtual objects according to the variation of the form of the effect object."

According to one aspect of the present disclosure, provided is "a program that causes a computer including an input interface that accepts, from a player, an operation input to an effect object disposed in a virtual space displayed on a display, and a memory configured to store one or a plurality of virtual objects disposed in the virtual space and parameters associated with one or each of a plurality of the virtual objects, to function as a processor that performs a process for varying a form of the effect object according to the operation input accepted by the input interface and to vary the parameter associated with at least one of one or a plurality of the virtual objects according to the variation of the form of the effect object."

According to one aspect of the present disclosure, provided is "a method performed by a processor by executing the instruction command in a computer including an input interface that accepts, from a player, an operation input to an effect object disposed in a virtual space displayed on a display, and a memory that stores one or a plurality of virtual objects disposed in the virtual space and parameters associated with one or each of a plurality of the virtual objects, in addition to a predetermined instruction command. The method includes the steps of varying a form of the effect object according to the operation input accepted by the input interface, and varying a parameter associated with at least one of one or a plurality of the virtual objects according to the variation of the form of the effect object."

According to various embodiments of the present disclosure, a processing device, program, and method can be provided to execute a new game application that incorporates a new factor in the variation of parameters associated with a virtual object.

Note that the above effects are merely illustrative for the convenience of description and are not limiting. In addition to or in place of the above effects, any of the effects described in the present disclosure or those skilled in the art can exhibit obvious effects.

BRIEF DESCRIPTION OF THE DRAWINGS

FIG. 4B is a view conceptually indicating an effect object table stored in the processing device 100 according to the first embodiment of the present disclosure. FIG. 4C is a view conceptually indicating an operation input table stored in the processing device 100 according to the first embodiment of the present disclosure.

DESCRIPTION OF EXEMPLARY EMBODIMENTS

Figure 1:
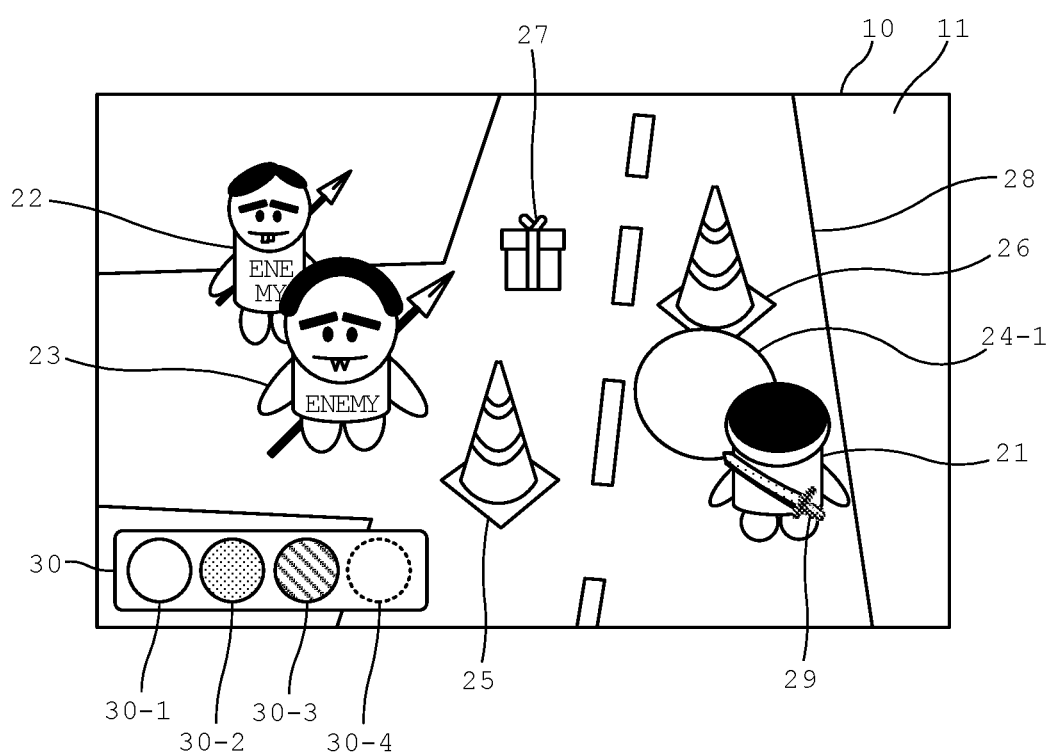
FIG. 1 is a view illustrating an example of a screen when a game application according to various embodiments of the present disclosure is executed.

Various embodiments of the present disclosure will be described with reference to the accompanying drawings. In addition, the common component in the drawings is denoted by the same referential signs.

Overview of Application Related to the Present Disclosure

An example of a game application according to various embodiments of the present disclosure is a game application using a virtual object disposed in a virtual space. A form of an effect object is varied according to an operation input of a player, and a parameter associated with the virtual object is varied according to the variation of the form.

Examples of such a game application include game applications such as a battle game in which a plurality of characters battle, a role playing game, and a sports game. Hereinafter, an outline of the game application according to the present disclosure will be described by taking a battle game as an example.

Figure 2:
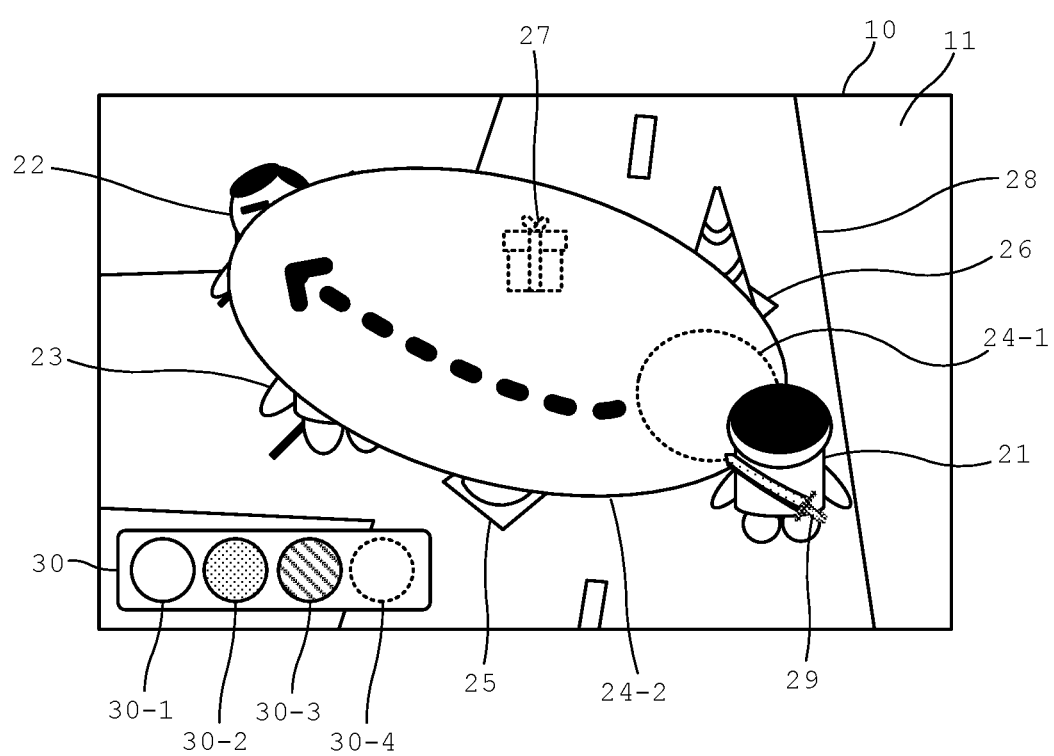
FIG. 2 is a view illustrating an example of a screen when a game application according to the various embodiments of the present disclosure is executed.

FIGS. 1 and 2 are views illustrating an example of a screen when a game application according to various embodiments of the present disclosure is executed. Specifically, FIG. 1 is an example of a screen showing a state before the form of an effect object 24-1 associated with a player character object 21 operable by a player is varied by the player performing an operation input on an input interface. Further, FIG. 2 is an example of a screen showing a state during or after the variation of the form of the effect object 24-1 according to the operation input of the player.

According to FIG. 1, a virtual space 11 is displayed on a game screen 10. In the virtual space 11, in addition to a road object 28 and obstacle objects 25 and 26 that are structure objects, the player character object 21 operable by a player, enemy character objects 22 and 23 operated by a player other than the above-described player or a computer, and a bonus item object 27 for providing a predetermined bonus to the player by obtaining the bonus item object are disposed. Further, the player character object 21 is associated with an accessory object 29 that can be used by the player character object 21 by the operation input by the player. Further, the effect object 24-1 is associated with the player character object 21. An effect object tray 30 is stocked with effect objects that have become available, for example, by obtaining bonus item objects while the game application is in progress. Stocks 30-1 to 30-3 drawn in solid lines indicate currently available effect objects, and stock 30-4 drawn in broken lines indicates that one more effect object can be stocked.

In such a game, the player can operate the effect object 24-1 in addition to the player character object 21 and the accessory object 29 through an input interface. As one example, the player can move the player character object 21 in the virtual space 11 by performing an operation input. Further, the player can use the accessory object 29 to attack the enemy character objects 22 and/or 23 by the operation input. Further, the player can change the size of the effect object 24-1 in accordance with the time when the operation is input.

According to FIG. 2, the effect object 24-1 is varied to the size of the effect object 24-2 by the operation input by the player. At this time, the visibility of the virtual space 11 displayed on the game screen 10 is obstructed by being varied to the size of the effect object 24-2. Specifically, the bonus item object 27 is completely covered by the effect object 24-2, and it makes difficult for the player to visually recognize the bonus item object 27. Further, a part of the obstacle objects 25 and 26 and a part of the road object 28 are covered, and it makes difficult for the player character object 21 to move. Furthermore, at least a part of the enemy character objects 22 and 23 are also covered, and it makes difficult to grasp the movement of the enemy character objects 22 and 23.

That is, in the game application according to the present disclosure, as an example, by varying the size of the effect object 24 according to the operation input, the visibility of other virtual objects existing behind the effect object 24 in a virtual space is obstructed, and the difficulty of the game is raised. However, in the game application according to the present disclosure, parameters of virtual objects located in the virtual space are changed (for example, the ability value of the player character object 21 is increased) according to the variation in size of the effect object 24 to impart the player a benefit.

As described above, in the game application according to the present disclosure, a more advanced game application is provided by incorporating a new game factor such as the variation in size of the effect object 24.

Note that, in the present disclosure, examples of the parameter to be varied include an ability value of the player character object, an ability value of the enemy character object, a movement speed of each character object, an attribute value of accessory objects usable in each character object, lottery probability in a game, and parameters such as a difficulty level in the progress of a game, or a combination thereof. Furthermore, not only these parameters but any parameter may be used.

Furthermore, the parameter may be a numerical value set as a parameter, or may be information specifying each category classified by the numerical value or the like. For example, in the case of the offensive power of the player character object, it may be a numerical value such as "50" or "100", or may be information specifying a category such as "strong" or "very strong".

Further, the parameter may be varied to be advantageous to the progress of a game for the player or to be disadvantageous. Furthermore, the parameter may be varied for a predetermined period determined in advance, may be varied before the end of one game play, or may be varied for a randomly determined period each time.

Further, the variation of the form of the effect object 24 varies the size of the effect object 24 in the examples of FIGS. 1 and 2. However, examples of the variation in the form of the effect object 24 include a size, a transmittance, a shape, or a combination thereof. Further, the present invention is not limited to these examples, and other forms may be varied.

Further, in addition to the character objects and accessories listed above as examples, examples of the virtual objects whose parameters are varied can include various virtual objects such as virtual item objects such as treasure boxes, recovery items, accessories, etc. and structure objects such as buildings, roads, bridges, mountains, and rivers, etc. For example, in the case of changing the parameters of the virtual item object, it is possible to vary the number of the objects placed in the virtual space or to vary the effect obtained by the use thereof. Further, in the case of varying the parameters of the structure objects, it is possible to vary the shape in the virtual space or to vary the influence given to each character object.

First Embodiment

Figures 3, 4A:
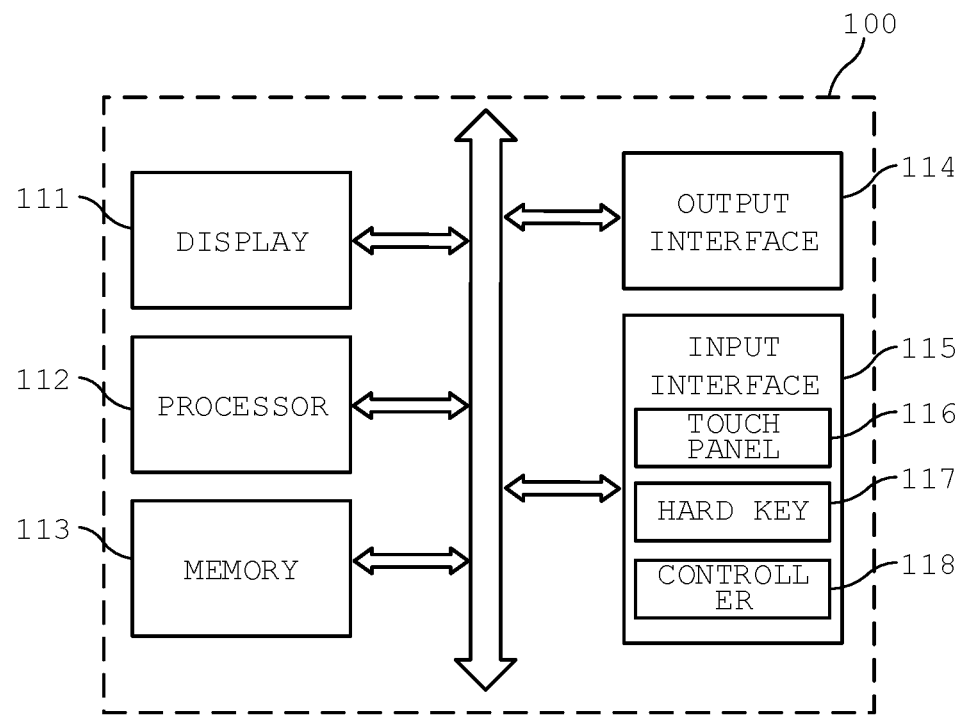
FIG. 3 is a block diagram illustrating an example of the configuration of a processing device 100 according to a first embodiment of the present disclosure.
FIG. 4A is a view conceptually indicating a character object table stored in the processing device 100 according to the first embodiment of the present disclosure.

1. Configuration of Processing Unit 100 According to First Embodiment of Present Disclosure FIG. 3 is a block diagram illustrating an example of the configuration of a processing device 100 according to a first embodiment of the present disclosure. The processing device 100 does not have to include all of the components illustrated in FIG. 3, and may have components in which a part is omitted, or other components may be added.

In the present embodiment, a case where a portable game machine having a display that can be displayed on a game screen is used as the processing device 100 will be described. However, not limited to portable game machines, the game application according to the present disclosure can be used as well in various processing devices such as a stationary game machine that displays a game screen on a display connected to the outside wirelessly or by wire, an arcade game machine, a smartphone, a feature phone, a portable information terminal, a PDA, a laptop computer, a desktop computer, etc.

Referring to FIG. 3, the processing device 100 includes a display 111, a processor 112, a memory 113, an output interface 114, a touch panel 116, and an input interface 115 including hard keys 117 and a controller 118. Then, these components are electrically connected to each other through control lines and data lines.

The display 111 reads the image information stored in the memory 113 according to an instruction of the processor 112, and displays various displays including a virtual space formed by the game application according to the present embodiment (for example, FIGS. 6, 7, 9 and 10) functions as a display unit. The display 111 is formed of, for example, a liquid crystal display or an organic EL display.

The processor 112 includes a CPU (microcomputer) and functions as a control unit that controls the other connected components based on various programs stored in the memory 113. Specifically, the processor 112 reads, from the memory 113, a program for executing a game application according to the present embodiment or a program for executing an OS and executes the programs. Further, the processor 112 generates various operation information based on output from the input interface 115. In the present embodiment, in particular, the processor 112 executes processing for accepting a player's operation input to an effect object disposed in a virtual space displayed on the display 111 or the like, processing for varying a form of the effect object according to the accepted operation input, and processing for varying parameters associated with virtual objects according to the variation of the effect object. Note that, the processor 112 may include a single CPU, but may include a plurality of CPUs. Further, other types of processors such as a GPU specialized for image processing may be combined as appropriate.

The memory 113 includes a ROM, a RAM, a non-volatile memory, an HDD, and the like, and functions as a storage unit. The ROM stores, as a program, an instruction command for executing an application or an OS according to the present embodiment. The RAM is a memory used to write and read data while a program stored in the ROM is being processed by the processor 112. The non-volatile memory is a memory in which data are written and read by execution of the program, and the data written to the non-volatile memory is saved even after the execution of the program has been completed. In the present embodiment, in particular, the memory 113 stores a program to execute processing for accepting a player's operation input to an effect object disposed in a virtual space displayed on the display 111 or the like, processing for varying a form of the effect object according to the accepted operation input, and processing for varying parameters associated with virtual objects according to the variation of the effect object. Further, the memory 113 also stores image data for performing various displays (for example, FIGS. 6, 7, 9, and 10) including the virtual space. Further, the memory 113 also stores a character object table (FIG. 4A), an effect object table (FIG. 4B), and an instruction input table (FIG. 4C). Note that, in the present embodiment, although not illustrated, as player information, such as a character object ID of a character object operable by a player, in association with a player ID (identification information) specifying the player, and an effect object ID (identification information) that specifies the effect object stocked so as to be selectable by a player are stored. The memory 113 may be unremovably disposed inside the processing device 100, but may be releasably disposed, for example, via the output interface 114 or the like.

The output interface 114 functions as an output unit for wireless or wired connection with the memory 113 and other components other than the processing device 100. Examples include a serial port, a parallel port, an I/O port such as a USB, a memory slot, and communication processing circuit for broadband or narrowband wireless communication, wired communication such as wired LAN, which are used for the purpose of connecting the memory 113, outputting a game screen to an external display, connecting a server device disposed remotely, or connecting with other processing device.

The input interface 115 includes at least one of the touch panel 116, the hard key 117, and the controller 118, and functions as an input unit that accepts an operation input from a player. The touch panel 116 is disposed so as to cover the display 111, and outputs information on position coordinates corresponding to image data displayed by the display 111 to the processor 112. As a touch panel method, known methods such as a resistive film method, an electrostatic capacitance coupling method, and an ultrasonic surface acoustic wave method can be used. The controller 118 includes a cross key and various buttons, and may be disposed on the main body surface of the processing device 100 in some cases, or it may be connected to the main body of the processing device 100 by wire or wirelessly and transmit information related to an operation input from a player to the main body. In the present embodiment, in particular, the input interface is used to perform an operation input to a character object or an operation input to an effect object, and any of the input interfaces 115 can be suitably used.

2. Information Stored in Memory 113 of Processing Unit 100

FIG. 4A is a view conceptually indicating a character object table stored in the processing device 100 according to the first embodiment of the present disclosure. As one example, the character object table is stored in the memory 113 of the processing device 100.

According to FIG. 4A, the character object table stores attribute values (hit points, offensive power, defensive power, recovery power and speed) and accessory object IDs (identification information) of the character in association with the character object ID. The character object ID is unique information assigned to each character, and is information for specifying each character object. The "hit point" is one of the parameters, which is increased or decreased by an attack from another character object or the like. "Offensive power" is a parameter related to the amount that affects the hit points of other character objects, and the higher the attack power, the more influence can be given. The "defensive ability" is a parameter indicating the resistance to an influence given by another character object, and the higher the defense amount, the smaller the influence exerted by the other character object. "Recovery power" is a parameter used when recovering hit points that are subtracted under the influence of other character objects, and the higher the recovery power, the more hit points can be recovered. "Speed" is a parameter indicating the speed at which the character object can move in the virtual space, and the higher the parameter, the faster the character object can move. The "accessory object ID" is information for specifying the accessory object that each character object can use, and the information is also updated as needed according to the selection of the effect object.

Each parameter stored in FIG. 4A will be updated as needed according to the change of the form of the effect object, the progress of the game, the use of the bonus item object, the influence given by other player character objects, the operation input from a player, etc.

FIG. 4B is a view conceptually indicating an effect object table stored in the processing device 100 according to the first embodiment of the present disclosure. As an example, the effect object table is stored in the memory 113 of the processing device 100.

In the present embodiment, one or a plurality of effect objects can be stocked by obtaining a bonus item object, using virtual game currency, etc. (effect object tray 30 in FIG. 6), and effect objects that inputs operation by selecting a player (effect object 24 in FIG. 6) is selected. Furthermore, in the present embodiment, the effect object and the accessory object used by the player character object (the player character object in FIG. 6) are associated, and the accessory object is also changed by changing the effect object.

Therefore, according to FIG. 4B, in the effect object table, in association with the effect object ID (identification information), the accessory object ID (identification information), the attribute value of the accessory (shape, offensive power of accessories, weight of accessories) is stored. The "effect object ID" is unique information given to each effect object, and is information for specifying each effect object. The "accessory object ID" is unique information given to each of the accessory objects, and is information for specifying each of the accessory objects. The "shape" is one of the attribute values of each accessory object, and the shape of each accessory is specified. Due to this difference in weight, the speed at which the character object uses the accessory and the range of influence affected to the opposing character object vary. The "offensive power" is a value indicating the influence on the offensive power of the character object when using each accessory, for example, when using the accessory object of "sword 1", the offensive power of the character object is raised to "1.2 times. The "weight" is one of the attribute values of each accessory object, and a virtual weight is preset. Due to this difference in weight, the speed at which the character object uses the accessory and the degree of influence on the opposing character object vary.

FIG. 4C is a view conceptually indicating an operation input table stored in the processing device 100 according to the first embodiment of the present disclosure. As one example, the operation input table is stored in the memory 113 of the processing device 100.

In the present embodiment, a form of the effect object is changed according to the operation input accepted by the input interface 115. The operation input table is a table in which the form and the like of the effect object which varies according to a player's operation input accepted by the input interface 115 are defined.

According to FIG. 4C, the operation input table stores the size of the effect object, the ratio of a visible area, and an effect, in association with the operation input accepted by the input interface 115. The "operation input" is information for identifying the player's operation input detected by an input interface. In the present embodiment, in the case of detecting that the predetermined input interface 115 (for example, a button of the controller 118) is pressed for a time shorter than a predetermined time t1, it is determined that an instruction input of "pressing" has been accepted, in the case of continuously pressing for a time t1 or more and less than t2, it is determined that an instruction input of "long press (t1 to t2)" has been accepted, in the case of continuously pressing for a time t2 or more and less than t3, it is determined that an instruction input of "long press (t2 to t3)" has been accepted, and in the case of continuously pressing for a time t3 or more, it is determined that an instruction input of "long press (t3 or more)" has been accepted. The "size of the effect object" is one of the forms of the effect object, and indicates a form of the effect object (the effect object 24 in FIG. 6) currently selected by a player which is varied by the player's operation input. For example, in the case of a simple "press", the size of the effect object is kept "small" (that is, not vary), and the size of the effect object varies to "medium" and "extra large" as the pressing time becomes longer. The "ratio of a visible area" is information indicating a ratio of the area where a player can visually recognize without limitation when limiting the area where the player can recognize a virtual space by varying the "form" of the effect object. The larger the form (size) of the effect object, the smaller the visible area is set. The "effect" is information indicating an effect to be provided to each parameter (FIGS. 4A and 4B) of the accessory object associated with the effect object and the player character object of the player using the effect object. When the player's operation input is a simple "press", the size of the effect object is also not varied, and each parameters of the accessory object and the player character object does not vary. However, the longer the operation input continues, the larger the size of the effect object, and the larger the influence on each parameter of the accessory object and the player character object accordingly. For example, when the character object ID "C1" is selected as the player character object, and the effect object ID "E1" is selected in association with the character object, when long press (t2–t3) is detected, it is possible to attack with the offensive power of "3.6 times" multiplied by "3" against the attack power "1.2 times" of the accessory object ID "sword 1", and each attribute value such as hit point and attack power of the character object is also set to a value obtained by multiplying "3".

Note that, although not illustrated, in the case where the virtual object to be varied by the effect object is an object other than the character object or the accessory object, a table that stores in association with parameters (shapes, effects, etc.) that are varied in addition to these object IDs (identification information) is provided.

3. Processing Flow Performed by Processing Unit 100

Figure 5:
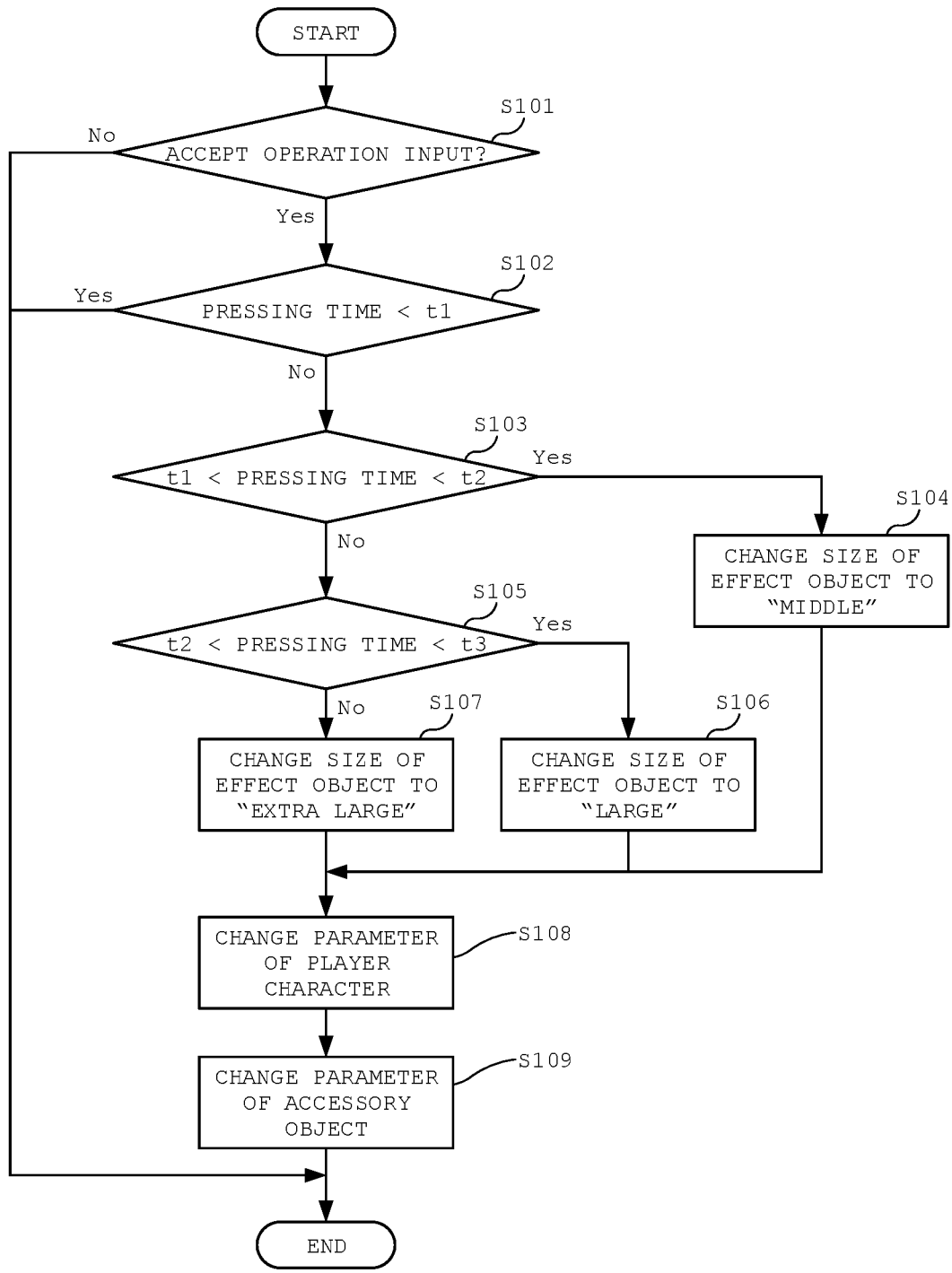
FIG. 5 is a diagram indicating a processing flow executed by the processing device 100 according to the first embodiment of the present disclosure.

FIG. 5 is a diagram indicating a process flow executed by the processing device 100 according to the first embodiment of the present disclosure. Specifically, FIG. 5 indicates a series of processes performed by the processor 112 from at a time when the operation input by a player is accepted by the processing device 100 to a time when the parameter of the virtual object is varied. The processing flow is executed in a predetermined cycle by the processor 112 cooperating with the input interface 115, the memory 113, and the like.

Referring to FIG. 5, the processor 112 determines whether or not an operation input by a player is accepted at the input interface 115 (S101). Then, when it is determined that the operation input is accepted, it is determined whether the time of the pressing operation input to the input interface 115 is less than t1 (S102). If it is less than t1, the process flow ends because the parameter associated with the character object or the accessory object does not vary. On the other hand, when the pressing operation time is not less than t1, the processor 112 determines whether or not the duration of the pressing operation is t1 or more and less than t2 (S103). If the duration of the pressing operation is t1 or more and less than t2, the processor 112 controls to change the size of the effect object to "middle" and display it on the display 111 with reference to FIG. 4C (S104). Then, in response to the change of the size of the effect object to "medium", the processor 112 updates the parameters (the ability values indicated in FIG. 4A) of the player character object to "double" respectively (S108), and the parameters (attribute values indicated in FIG. 4B) of the accessory object associated with the player character is updated to be "double" (S109).

If the duration of the pressing operation is not t1 or more and less than t2, the processor 112 determines whether or not the duration of the pressing operation is t2 or more and less than t3 (S105). If the duration of the pressing operation is t2 or more and less than t3, the processor 112 controls to change the size of the effect object to "large" and display it on the display 111 with reference to FIG. 4C (S106). Then, in response to the change of the size of the effect object to "large", the processor 112 updates the parameters (the ability values indicated in FIG. 4A) of the player character object to "3 times" respectively (S108), and the parameters (attribute values indicated in FIG. 4B) of the accessory object associated with the player character is updated to be "3 times" respectively (S109).

If the duration of the pressing operation is not t2 or more and less than t3, that is, t3 or more, the processor 112 controls to change the size of the effect object to "extra large" with reference to FIG. 4C and display it on the display 111 (S107). Then, in response to the change of the size of the effect object to "extra large", the processor 112 updates the parameters (ability values indicated in FIG. 4A) of the player character object to "5 times" respectively (S108), and the parameters (attribute values indicated in FIG. 4B) of the accessory object associated with the player character is updated to be "5 times" respectively (S109).

Thus, the processor 112 executes processing to vary the form of the effect object according to the operation input accepted by the input interface 115 and vary the parameters associated with the player character object or the accessory object according to the variation of the form of the effect object. Note that, in the present embodiment, although not illustrated, the processor 112 performs processing for returning each parameter that has been once varied, to a state before the variation after the elapse of a predetermined time (for example, 30 seconds). Specifically, the effect object is displayed so as to change back to its original size at a constant speed after being greatly varied according to the operation input. Then, when it is displayed that the processor 112 has returned to its original size, the processor 112 processes to return to the parameters before the variation.

Figure 6:
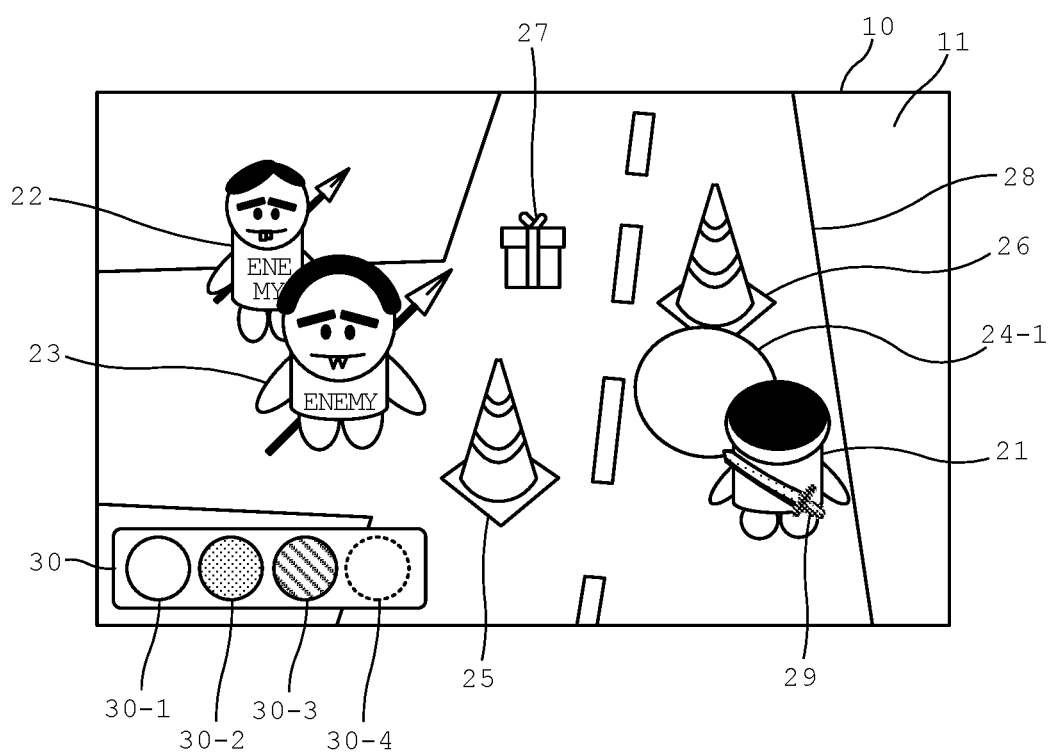
FIG. 6 is a view illustrating an example of a screen when a game application according to the first embodiment of the present disclosure is executed.

FIG. 6 is a view illustrating an example of a screen when a game application according to the first embodiment of the present disclosure is executed. Specifically, FIG. 6 is an example of a screen showing a state before the form of the effect object 24-1 associated with the player character object 21 operable by a player is varied by the player performing an operation input on the input interface 115.

According to FIG. 6, the virtual space 11 is displayed on the game screen 10. In the virtual space 11, in addition to the road object 28 and the obstacle objects 25 and 26 that are structure objects, a player character object 21 operable by a player (refer to "C1" in FIG. 4A), the enemy character objects 22 and 23 operated by another player other than the player or a computer, and the bonus item object 27 obtained to provide a predetermined bonus to the player are disposed. The effect object tray 30 is stocked with effect objects that have become available, for example, by obtaining the bonus item objects and using in-game currency while a game application is in progress. Stocks 30-1 to 30-3 drawn in solid lines indicate currently available effect objects, and stock 30-4 drawn in broken lines indicates that one more effect object can be stocked. A desired effect object is selected from among the stocks 30-1 to 30-3 stocked in the effect object tray 30 in accordance with the operation input input by a player. In the example of FIG. 6, when the effect object 24-1 is selected by the player, an effect object 24-1 ("E1" in FIG. 4B) is displayed in association with the player character object 21, the accessory object 29 ("sword 1" in FIG. 4B) associated with the selected effect object 24-1 is displayed in association with the player character object.

4. Game Screen 10 Displayed by Processing Unit 100

Figure 7:
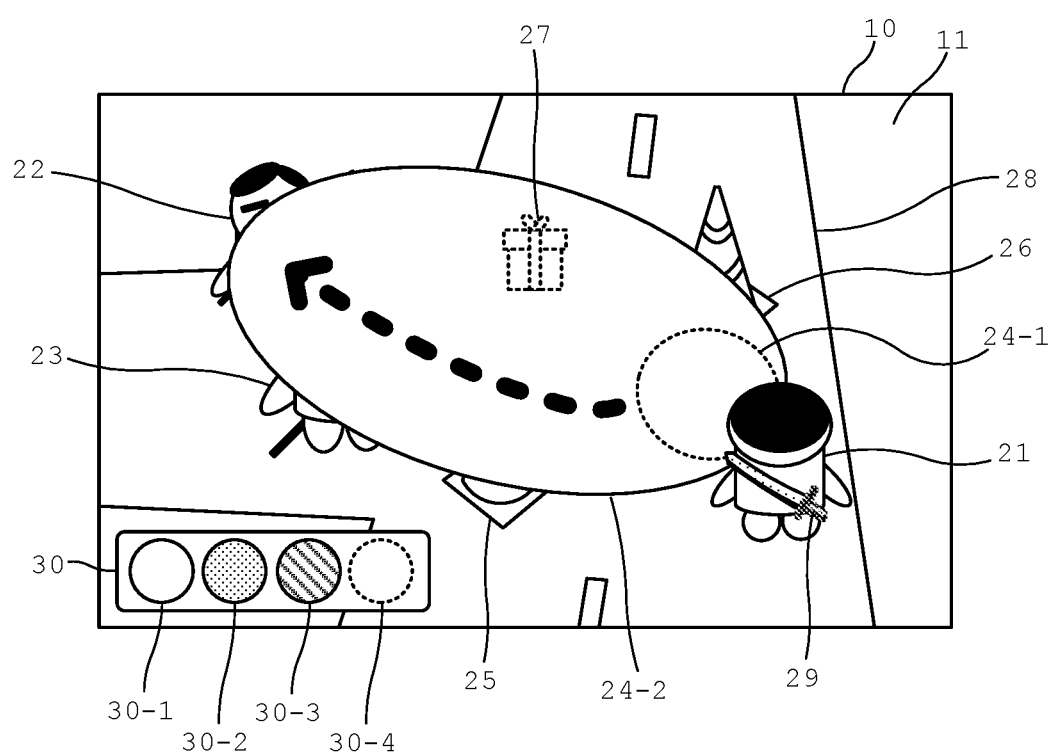
FIG. 7 is a view illustrating an example of a screen when a game application according to the first embodiment of the present disclosure is executed.

FIG. 7 is a view illustrating an example of a screen when a game application according to the first embodiment of the present disclosure is executed. Specifically, FIG. 7 is an example of a screen showing a state after the form of the effect object 24-1 associated with the player character object 21 operable by a player is varied by the player performing an operation input ("long press (t2 to t3)") on the input interface 115.

According to FIG. 7, in response to the operation input ("long press (t2 to t3)") being accepted by the input interface 115, the form of the effect object 24-1 varies until it becomes the form of the effect object 24-2. Specifically, as illustrated in FIG. 4C, the size of the effect object associated with the long press (t2 to t3) is changed to "large" and displayed on the game screen 10. At this time, as apparent also in FIG. 7, the visibility of the virtual space 11 displayed on the game screen 10 is obstructed by being varied to the size of the effect object 24-2. As illustrated in FIG. 4C, each virtual object disposed in the depth direction with respect to the effect object 24-2 in the virtual space 11 is covered by the effect object 24-2 such that only "50%" of the game screen 10 is a visible area. Specifically, the bonus item object 27 is completely covered by the effect object 24-2, and the player cannot visually recognize the bonus item object 27. Further, a part of the obstacle objects 25 and 26 and a part of the road object 28 are covered, and it makes difficult for the player character object 21 to move. Furthermore, at least a part of the enemy character objects 22 and 23 are also covered, and it makes difficult to grasp the movement of the enemy character objects 22 and 23.

FIGS. 8A to 8D are views conceptually illustrating the ratio of the effect object to a viewable area in the game application according to the first embodiment of the present disclosure. Specifically, according to the change of the form of the effect object 24, the area visible to the player in the virtual space 11 displayed on the game screen 10 is varied as illustrated in the operation input table of FIG. 4C, and FIGS. 8A to 8D indicate the state of the variation.

Figure 8A:
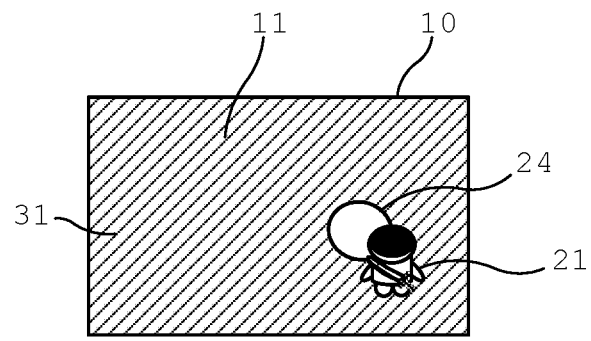
FIG. 8A is a view conceptually illustrating the ratio of an effect object to a viewable area in the game application according to the first embodiment of the present disclosure.

FIG. 8A illustrates the case where the operation input is "pressing" of less than t1, and the size of the effect object 24 is "small", that is, no variation. In this case, as illustrated in FIG. 8A, a virtual object located behind the effect object 24 in the virtual space 11 is covered by the effect object 24. On the other hand, the area 31 of 90% (FIG. 4C) of the game screen 10 is visibly displayed on the game screen 10 as an area visible by a player without being covered by the effect object 24. That is, in the virtual space 11, the virtual object disposed at the position corresponding to the area 31 is displayed so as to be visible to the player without being obstructed by the effect object 24.

Figure 8B:
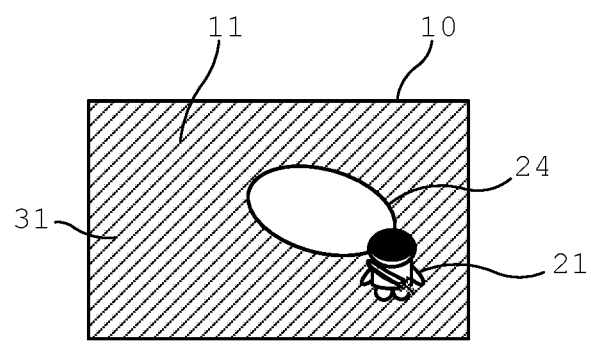
FIG. 8B is a view conceptually illustrating the ratio of an effect object to a viewable area in the game application according to the first embodiment of the present disclosure.

FIG. 8B illustrates the case where the operation input is "long press (t1 to t2)" of t1 or more and less than t2, and the size of the effect object 24 is varied to "middle". In this case, as illustrated in FIG. 8B, a virtual object located behind the effect object 24 in the virtual space 11 is covered by the effect object 24. On the other hand, the area 31 of 70% (FIG. 4C) of the game screen 10 is visibly displayed on the game screen 10 as an area visible by the player without being covered by the effect object 24.

Figure 8C:
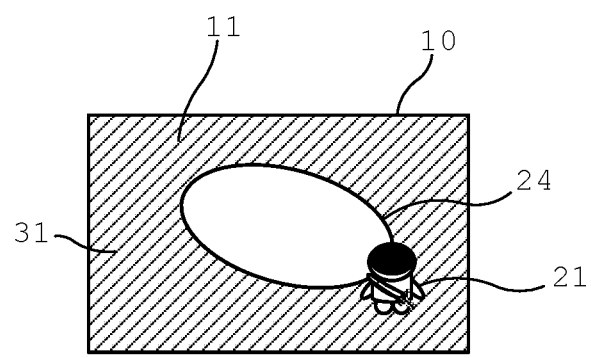
FIG. 8C is a view conceptually illustrating the ratio of an effect object to a viewable area in the game application according to the first embodiment of the present disclosure.

FIG. 8C illustrates the case where the operation input is "long press (t2 to t3)" of t2 or more and less than t3, and the size of the effect object 24 is varied to "large". In this case, as illustrated in FIG. 8C, a virtual object located behind the effect object 24 in the virtual space 11 is covered by the effect object 24. On the other hand, the area 31 of 50% (FIG. 4C) of the game screen 10 is visibly displayed on the game screen 10 as an area visible by the player without being covered by the effect object 24.

Figure 8D:
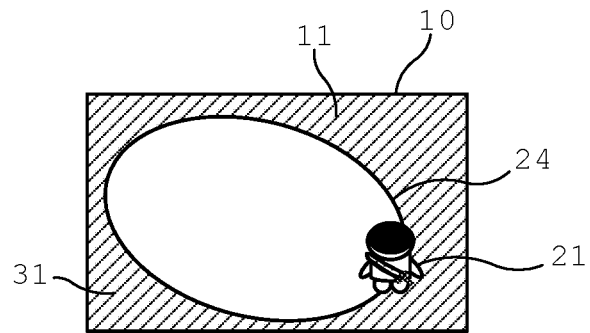
FIG. 8D is a view conceptually illustrating the ratio of an effect object to a viewable area in the game application according to the first embodiment of the present disclosure.

FIG. 8D illustrates the case where the operation input is "long press (t3 or more)" of t3 or more and the size of the effect object 24 is changed to "extra large". In this case, as illustrated in FIG. 8D, a virtual object located behind the effect object 24 in the virtual space 11 is covered by the effect object 24. On the other hand, only the area 31 of 30% (FIG. 4C) of the game screen 10 is visibly displayed on the game screen 10 as an area visible by the player without being covered by the effect object 24.

As described above, in the present embodiment, the form of the effect object 24 varies according to the operation input by the player, but the ratio in the virtual space 11 visible to the player changes according to the variation, and the degree of obstruction to the visual recognition of the virtual space 11 by the effect object 24 changes. Here, in accordance with the variation of the form of the effect object 24, the parameter of the virtual object is varied. That is, the parameters of the virtual object are varied in accordance with the proportion of the virtual space visible to the player.

Figure 9:
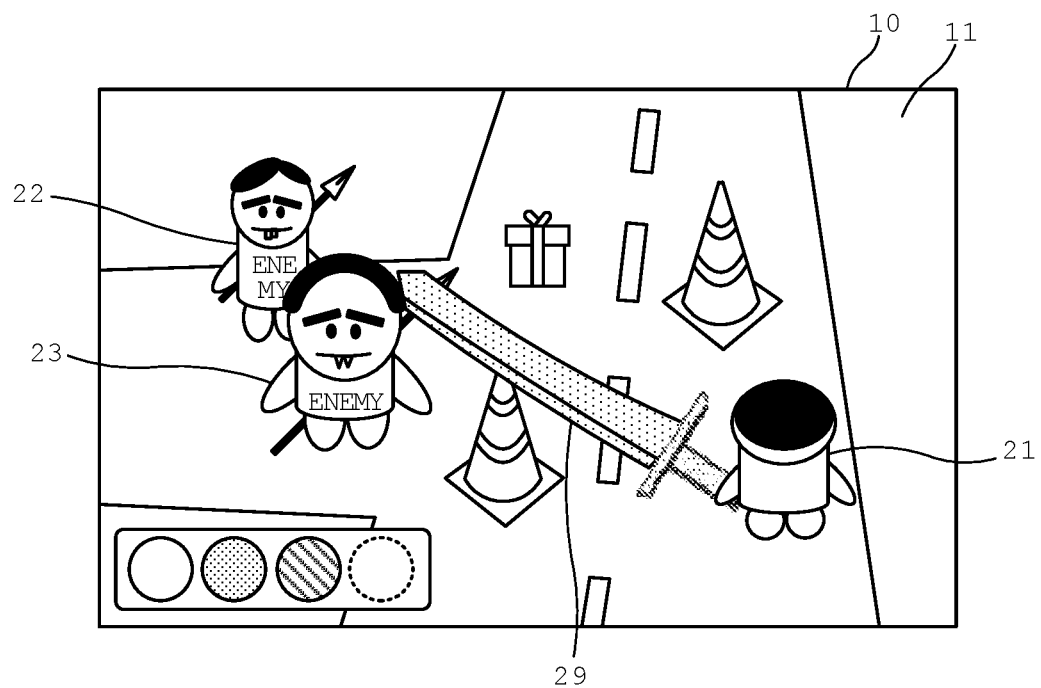
FIG. 9 is a view illustrating an example of a screen when a game application according to the first embodiment of the present disclosure is executed.
Figure 10:
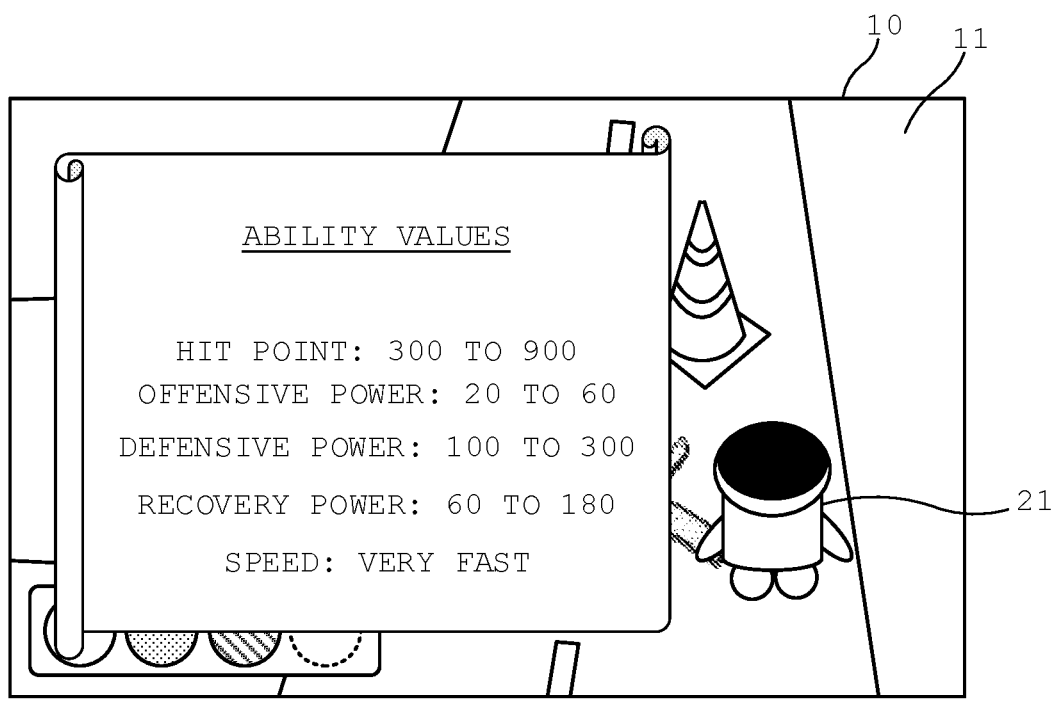
FIG. 10 is a view illustrating an example of a screen when a game application according to the first embodiment of the present disclosure is executed.

FIGS. 9 and 10 are views illustrating an example of a screen when the game application according to the first embodiment of the present disclosure is executed. Specifically, FIGS. 9 and 10 indicate examples of screens when the parameters of each virtual object are varied since the form of the effect object 24 is changed to "large".

In the example of FIG. 9, as illustrated in "effect" of FIG. 4C, the parameter value of each virtual object varies according to the size of the effect object 24 after the variation. Specifically, according to FIG. 9, among the attribute values of the accessory object 29 operable by the player character object 21, "size" is virtually "B1×3 times" or virtually "weight" is displayed to be "1 kg×3 times" weight. Note that, in the present embodiment, the range in which the enemy character objects 22 and 23 can be influenced (attacked) can be enlarged by updating the processor 112 such that the attribute values of the size of the accessory object 29 becomes large. On the other hand, by updating the processor 112 such that the virtual weight of the accessory object 29 is heavy, the operation speed by the player character object 21 is set to a low speed, and continuous influence on the enemy character objects 22 and 23 can be made difficult.

In the example of FIG. 10 as illustrated in "effect" of FIG. 4C, the parameter value of each virtual object varies according to the size of the effect object 24 after the variation. Specifically, according to FIG. 10, among the ability values stored in relation to the player character object 21 ("C1" in FIG. 4A), each ability value of "hit point", "offensive power", "defensive power", and "recovery power" is updated to 3 times the initial value, and "speed" is updated from "normal" to "very fast". That is, the processor 112 causes the player character object 21 to advance in an advantageous manner in the battle process with the enemy character objects 22 and 23. Further, when moving the player character object 21 into the virtual space 11 by the operation input from the player, the processor 112 performs processing so as to move at a "very fast" speed.

As described above, in the present embodiment, it is possible to provide a new game application in which a new element is incorporated in the variation of the parameter related to the virtual object. In addition, although the form of the effect object 24 can be varied according to the operation input of the player, the parameter related to the virtual object is changed according to the variation. That is, in changing the degree of difficulty of the game, a new factor of variation of the form of the effect object can be introduced. In addition, the variation of the form of the effect object may vary the viewable area of the game screen, which may cause a disadvantage for the player. On the other hand, the parameters of the virtual object may be advantageously changed for the player according to the variation of the effect object. Therefore, in changing the degree of difficulty of the game, it is possible to introduce a new game factor such as the variation of the visible area of the game screen.

Other Embodiments

Figure 11:
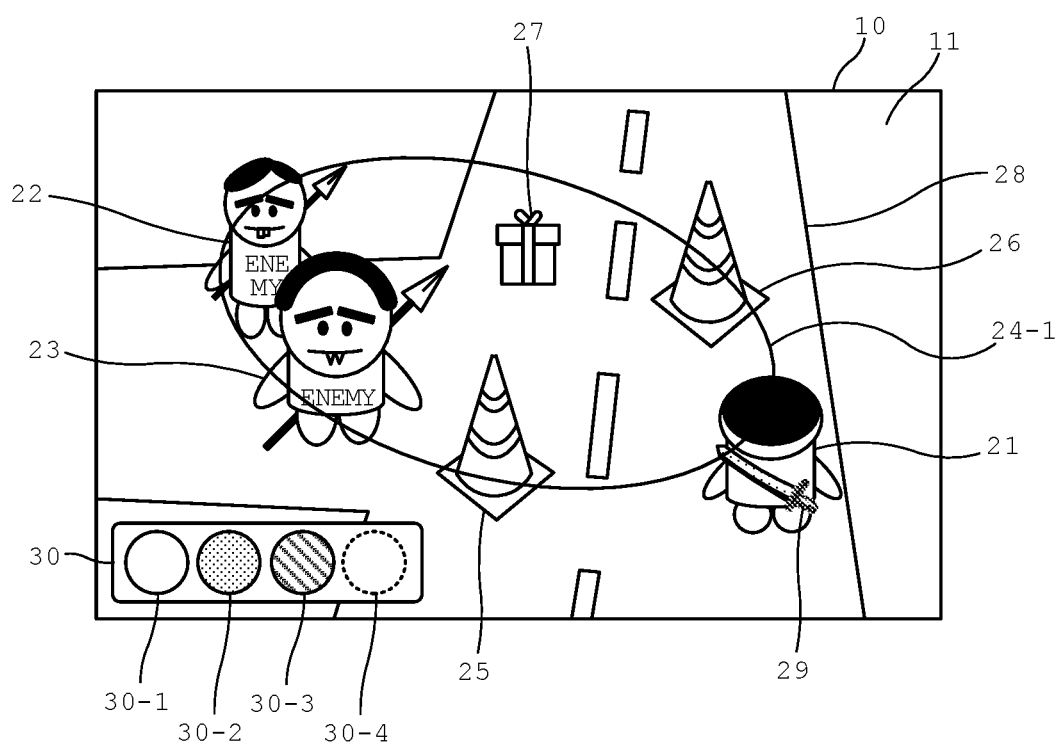
FIG. 11 is a view illustrating an example of a screen when a game application according to another embodiment of the present disclosure is executed.
Figure 12:
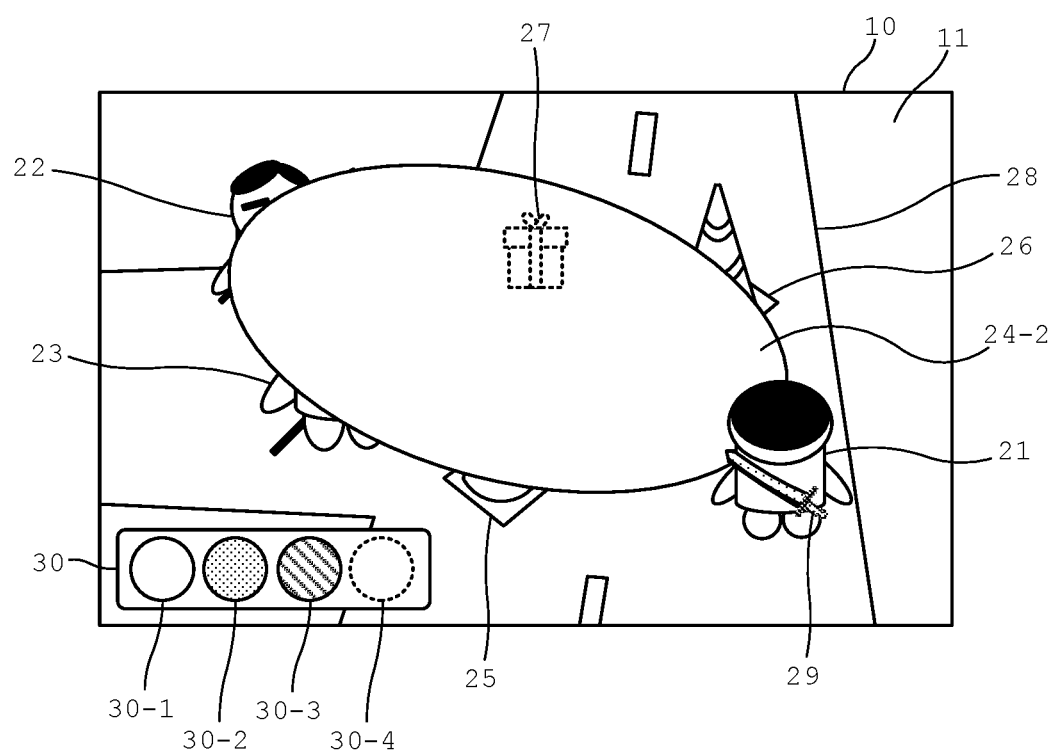
FIG. 12 is a view illustrating an example of a screen when a game application according to another embodiment of the present disclosure is executed.

In the first embodiment, "size" has been described as an example of the form of the effect object that is varied according to the operation input of the player. However, the form of the effect object is not limited to "size", and may be any form such as a shape, a transmittance, and a combination thereof. FIGS. 11 and 12 are views illustrating an example of a screen when a game application according to the other embodiment of the present disclosure is executed. Specifically, FIGS. 11 and 12 show an example in the case where "transmittance" is changed as the form of the effect object.

FIG. 11 shows the game screen 10 when the player selects the stock 30-1 from the effect object tray 30, and the effect object 24-1 is displayed. On the screen, although the effect object 24-1 is displayed so as to be superimposed on the virtual space 11, since "transparent" is set as the initial value of the effect object 24, only the outline is displayed, and the enemy character objects 22 and 23 located on the back side and other virtual objects are displayed in a transparent manner.

FIG. 12 shows the game screen 10 when "long press (t3 or more)" is detected as the operation input by the player and the effect object 24-2 is completely opaque. In the screen, the enemy character objects 22 and 23 located behind the effect object 24-2 and other virtual objects are covered with the effect object 24-2 and displayed such that they cannot be viewed by the player.

In the examples illustrated in FIGS. 11 and 12, the cases have been described in which the effect objects 24-1 and 24-2 are "completely transparent" and "completely opaque" respectively. However, the present invention is not limited to these, and the transmittance is appropriately adjusted, and in the case of normal pressing, the transmittance of the effect object 24-1 is set to 90%, and the transmittance may be lowered according to the time for which long press is continued.

Further, in the examples of FIGS. 11 and 12, the case has been described in which only the transparency of the effect objects 24-1 and 24-2 is changed according to an operation input from a player. However, the present invention is not limited to this, and as in the case of the effect object 24 of the first embodiment, the size of the effect object is also varied to change both the transparency and the size according to the operation input, and the degree of visual obstruction in the virtual space may be varied.

In the first embodiment, the case has been described in which the form of the effect object 24 varies according to the operation input of the player and the parameter of the virtual object changes according to the variation. However, it is also possible to change the type of the virtual object in accordance with the change in the form of the effect object 24. Specifically, "effect" in the operation input table illustrated in FIG. 4C is replaced with "type of virtual object". As an example, the accessory object usable by the player character object 21 may be changed to "sword 1" in the case of press, "sword 2" in the case of long press (t1 to t2), "sword 3" in the case of long press (t2 to t3), "sword 4" in the case of long press (t3 or more).

In the first embodiment, the case is described in which there are four types of operation inputs input by the player; "press", long press (t1 to t2), long press (t2 to t3), and long press (t3 or more). However, it is possible to divide into more types according to the time when the operation input continues, and it is also possible to divide into fewer types. In addition, the types are not divided only by the time during which the operation input continues, but the type of operation input can be divided by using the number of times the operation input is made like "single tap" and "double tap", the number of operations input simultaneously, or in combinations thereof.

Thus, also in this embodiment, it is possible to provide a new game application in which a new factor is incorporated in the variation of parameters related to the virtual object. In addition, although the form of the effect object 24 can be varied according to the operation input of the player, the parameter related to the virtual object is changed according to the variation. That is, in changing the degree of difficulty of the game, a new factor of variation of the form of the effect object can be introduced. In addition, the variation of the form of the effect object may vary the viewable area of the game screen, which may cause a disadvantage for the player. On the other hand, the parameters of the virtual object may be advantageously changed for the player according to the variation of the effect object. Therefore, in changing the degree of difficulty of the game, it is possible to introduce a new game factor such as the variation of the visible area of the game screen.

It is also possible to configure the system by appropriately combining or replacing the respective elements described in the respective embodiments.

The processes and procedures described herein can be realized not only by those explicitly described in the embodiments, but also by software, hardware, or a combination thereof. Specifically, the processes and procedures described in this specification are realized by implementing logic corresponding to the process on a medium such as an integrated circuit, volatile memory, non-volatile memory, magnetic disk, optical storage, etc. In addition, the processes and procedures described in the present specification can be implemented as computer programs of the processes and procedures and can be executed by various computers including a processing device and a server device.

Even though the processes and procedures described herein may be described as being performed by a single device, software, component, module, such processes or procedures may be performed by multiple devices, multiple software, multiple components and/or multiple modules. Further, even if it is described that various information described in the present specification is stored in a single memory or storage unit, such information may be stored in a plurality of memories provided in a single device or a plurality of memories distributed in a plurality of devices separately. Furthermore, the software and hardware elements described herein may be implemented by integrating them into fewer components or breaking them down into more components.

The processing device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A processing device comprising:
an input interface configured to accept an operation input relating to an effect object from a player in a real world, the effect object being disposed in a virtual space displayed on a display;
a memory configured to store one or a plurality of virtual objects disposed in the virtual space, parameters associated with the one or the plurality of virtual objects, and computer readable instructions; and
a processor configured to execute the computer readable instructions so as to:
vary a form of the effect object according to the operation input accepted by the input interface; and
vary a corresponding one of the parameters associated with at least the one or the plurality of virtual objects according to the form variation of the effect object,
wherein one of the one or the plurality of virtual objects is an accessory object that is usable by a character object in the virtual space, and
the corresponding one of the parameters corresponds to a first parameter of the parameters, and the first parameter is an attribute value of at least one of a shape or a weight associated with the accessory object.

2. The processing device according to claim 1, wherein the processor varies a ratio of an area visible to the player in the virtual space according to the form variation of the effect object, and the processor varies the corresponding one of the parameters according to the ratio.

3. The processing device according to claim 1, wherein the form of the effect object is varied according to an operation time of the operation input performed by the player with respect to the input interface.

4. The processing device according to claim 1, wherein a size of the form of the effect object that is displayed on the display is proportional to an operation time of the operation input performed by the player with respect to the input interface.

5. The processing device according to claim 1, wherein the plurality of virtual objects includes the character object, and the character object is operable by the player.

6. The processing device according to claim 5, wherein the corresponding one of the parameters corresponds to another parameter of the parameters, and the another parameter is an ability value of the character object.

7. The processing device according to claim 5, wherein the corresponding one of the parameters corresponds to another parameter of the parameters, and the another parameter is a moving speed of the character object in the virtual space.

8. The processing device according to claim 1, wherein the effect object obstructs a visibility of the player with respect to at least one of the character object, a bonus item object, or a structure object disposed in the virtual space by varying the form of the effect object.

9. The processing device according to claim 1, wherein the form of the effect object is at least one of a size, transparency, or a shape of the effect object.

10. A computer program product embodying computer readable instructions stored on a non-transitory computer-readable storage medium for causing a computer to execute a process by a processor so as to perform the steps of:
accepting an operation input relating to an effect object from a player in a real world, the effect object being disposed in a virtual space displayed on a display;
varying a form of the effect object according to the operation input; and
varying a corresponding one of parameters associated with at least one or a plurality of virtual objects according to the varied form of the effect object,
wherein one of the one or the plurality of virtual objects is an accessory object that is usable by a character object in the virtual space, and
the corresponding one of the parameters corresponds to a first parameter of the parameters, and the first parameter is an attribute value of at least one of a shape or a weight associated with the accessory object.

11. The computer program product embodying the computer readable instructions stored on the non-transitory computer-readable storage medium according to claim 10, wherein the processor varies a ratio of an area visible to the player in the virtual space according to the form variation of the effect object, and the processor varies the corresponding one of the parameters according to the ratio.

12. The computer program product embodying the computer readable instructions stored on the non-transitory computer-readable storage medium according to claim 10, wherein the form of the effect object is varied according to an operation time of the operation input performed by the player with respect to the input interface.

13. The computer program product embodying the computer readable instructions stored on the non-transitory computer-readable storage medium according to claim 10, wherein a size of the form of the effect object that is displayed on the display is proportional to an operation time of the operation input performed by the player with respect to the input interface.

14. The computer program product embodying the computer readable instructions stored on the non-transitory computer-readable storage medium according to claim 10, wherein the plurality of virtual objects includes the character object, and the character object is operable by the player, and the corresponding one of the parameters corresponds to another parameter of the parameters, and the another parameter is one of an ability value of the character object or a moving speed of the character object in the virtual space.

15. The computer program product embodying the computer readable instructions stored on the non-transitory computer-readable storage medium according to claim 10, wherein the effect object obstructs a visibility of the player with respect to at least one of the character object, a bonus item object, or a structure object disposed in the virtual space by varying the form of the effect object, and the form of the effect object is at least one of a size, transparency, or a shape of the effect object.

16. A method performed for causing a processor in a computer to execute a process, the computer including an input interface configured to accept, from a player, an operation input to an effect object disposed in a virtual space displayed on a display, and a memory configured to store one or a plurality of virtual objects disposed in the virtual space, parameters associated with one or each of a plurality of the virtual objects and computer readable instructions, the method comprising executing on the processor the computer readable instructions comprising the steps of:
accepting the operation input relating to the effect object from the player in a real world, the effect object being disposed in the virtual space displayed on the display;
varying a form of the effect object according to the operation input; and
varying a corresponding one of parameters associated with at least one or a plurality of virtual objects according to the varied form of the effect object,
wherein one of the one or the plurality of virtual objects is an accessory object that is usable by a character object in the virtual space, and
the corresponding one of the parameters corresponds to a first parameter of the parameters, and the first parameter is an attribute value of at least one of a shape or a weight associated with the accessory object.

17. The method according to claim 16, wherein the processor varies a ratio of an area visible to the player in the virtual space according to the form variation of the effect object, and the processor varies the corresponding one of the parameters according to the ratio.

18. The method according to claim 16,
wherein the form of the effect object is varied according to an operation time of the operation input performed by the player with respect to the input interface.

19. The method according to claim 16,
wherein a size of the form of the effect object that is displayed on the display is proportional to an operation time of the operation input performed by the player with respect to the input interface.

20. The method according to claim 16,
wherein the plurality of virtual objects includes the character object, and the character object is operable by the player, and the corresponding one of the parameters corresponds to another parameter of the parameters, and the another parameter is one of an ability value of the character object or a moving speed of the character object in the virtual space.

21. The method according to claim 16,
wherein the effect object obstructs a visibility of the player with respect to at least one of the character object, a bonus item object, or a structure object disposed in the virtual space by varying the form of the effect object, and the form of the effect object is at least one of a size, transparency, or a shape of the effect object.

* * * * *